E. SMITH.

Stoves.

No. 5,962. Reissued July 7, 1874.

Witnesses:
Henry W. Ray
W. E. Barker

Inventor:
Elisha Smith
Per Somes & Co.
Attorneys.

THE GRAPHIC CO. PHOTO-LITH. 39 & 41 PARK PLACE, N.Y.

UNITED STATES PATENT OFFICE.

ELIHU SMITH, OF ALBANY, NEW YORK.

IMPROVEMENT IN STOVES.

Specification forming part of Letters Patent No. 88,986, dated April 13, 1869; reissue No. 5,709, dated December 30, 1873; reissue No. 5,962, dated July 7, 1874; application filed June 27, 1874.

DIVISION A.

*To all whom it may concern:*

Be it known that I, ELIHU SMITH, of the city and county of Albany, in the State of New York, have invented certain new and useful Improvements in Base-Burning Stoves, of which the following specification is sufficiently full, clear, and exact, to enable those skilled in the art to which the invention appertains to make and use the same, reference being had to the accompanying drawings, which form a part hereof.

My invention consists in the organization and arrangement of the following parts, and their application to base-burning coal-supply reservoir heating-stoves, viz: An extended descending flue in the rear, an ascending flue also in the rear, near to or adjoining the said descending flue, and a horizontal flue in communication with the said descending and ascending flues, entirely below the bottom plate proper of the stove, said horizontal flue being so formed as to conduct the entire volume of escaping smoke and gases evolved during the process of combustion, and received through the said descending flue in a single continuous current from rear to rear, in a forward course from rear to front, and in a backward course from front to rear, securing a more regular and extended passage for said volume of gases, and obtaining a certain, free, and uniform draft, drawing off all the gases from the reservoir, and preventing the escape of any portion thereof into the room being warmed. I thus am enabled to dispense with any special provisions for carrying off gases from the reservoir.

Figure 5:
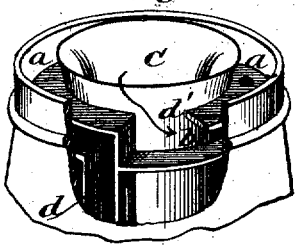
Figure 6:
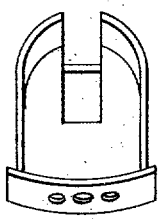
Figure 1:
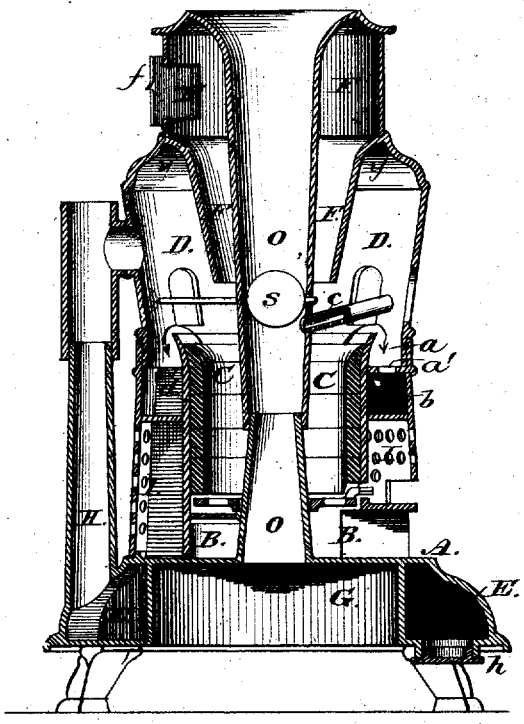
Figure 2:
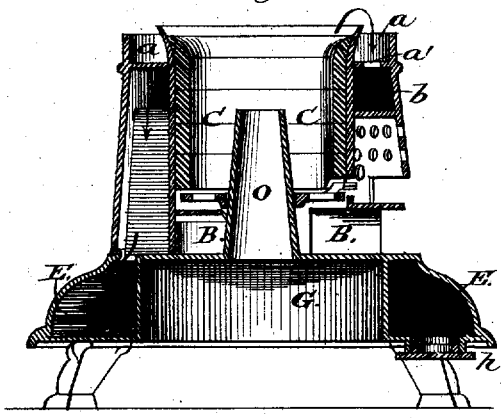
Figure 3:
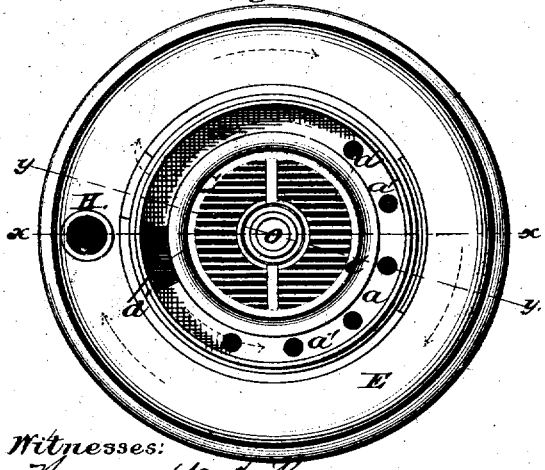
Figure 4:
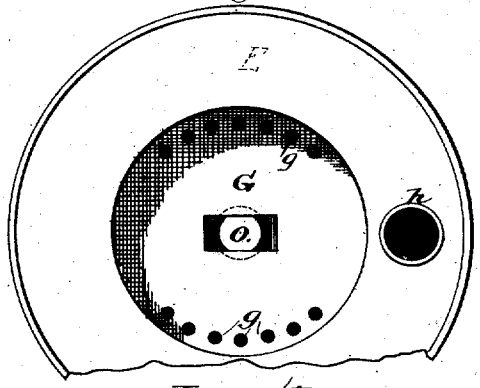

In the annexed drawings, Figure 1 represents a vertical section, on line *x x* of Fig. 3, of a heating-stove having my improvements incorporated into its organization. Fig. 2 is a vertical section, on line *y y* of Fig. 3, of that portion of the stove which is below the combustion-chamber, showing the descending and the upper and lower annular flues. Fig. 3 is a horizontal section, taken at the top of the fire-pot, and showing in said section so much of the stove as is represented in Fig. 2. Fig. 4 is a bottom view of my stove. Fig. 5 is a perspective view of the upper portion of the fire-pot and the outer casing inclosing the same, with a portion of the latter broken away, showing the upper annular and descending flues. Fig. 6 is a representation of the ash-drawer.

A is the base or bottom-plate proper of the stove; B is the ash-chamber; C, the fire-pot; D, the combustion chamber, provided with mica windows; and F the coal-reservoir, which latter is supplied through the feed-door *f*. *a* represents an annular space or open chamber formed between the outer casing and the extreme upper portion of the fire-pot, receiving the products of combustion over and all around the upper edge of the latter, whence they may pass down through openings *a* and the larger opening *d'* into the upper annular flue *b*, surrounding an annular section of the upper portion of the fire-pot, in which flue they pass horizontally, or nearly so, from the point of entrance to the descending flue *d*, which has its opening into the said annular flue next adjoining the upward opening *d'* in said flue. This descending flue *d* extends below the bottom plate proper, and opens into flue E, thereunder. In this flue E the escaping gaseous products of combustion pass in a single continuous current from rear to rear in a forward course, on one side from rear to front, and in a backward course on the opposite side from front to rear, performing a complete, or approximately complete, circuit underneath the bottom-plate, and heating the entire circumference of the circular outer plate of said flue. From this sub-base flue the escaping products enter the exit-pipe H, through which they are drawn to the chimney after having given off, by radiation and conduction, almost the entire quantity of heat which they have absorbed or taken from the combustion-chamber during the process of combustion. O is a flue for heating air by passing it through the fire-pot and combustion-chamber, said flue extending through the bottom plate and through the ash-chamber, fire-pot, combustion-chamber, and reservoir, and open at the top of the stove. This flue is made rectangular at that part which passes through the ash-chamber, for the purpose of easily fitting the ash-drawer to the same. It is made cylindrical at that part which passes through the grate, for the purpose of enabling the grate to rotate about the same. This vertical hot-air flue communicates with the open space in the room through lateral branch flues, as represented at *c*, Fig. 1. These lateral flues pass from the main upright flue through the fire or combustion chamber, and through the outer casing of the stove, for the purpose of discharging the heated air of the main flue lower down or nearer the floor than the top of the stove.

When it is desirable to discharge the heated air in the upper part of the room through the mouth of the flue at the top of the stove, the valve *s* in said flue is opened, as shown in the figure; but when it is desirable to discharge the heated air lower down in the room, through the branch flue *c*, the valve *s* is closed, and the air is compelled to pass out through the lateral branch flues. The vertical air-flue O opens at the base of the stove into a circular open chamber, G, thereunder, formed by the annular flue E and the bottom plate A. In this chamber the air may be heated to some extent before entering the flue O. This flue is gradually enlarged, from a point within the fire-pot or combustion-chamber to its top, for the purpose of facilitating the expansion of the air passing through it. If desired, the heating of the air by direct contact with the outer surface of the fire-pot may be effected by the formation of a chamber, I, between the latter and the outer casing surrounding the same, said casing being perforated, as shown in Figs. 1 and 2, and the air to be heated passed up from the chamber G through openings *g*, which would, in this case, be formed in the bottom plate A, and when so heated, would escape into the room through the perforations referred to. The arrows in Fig. 3 indicate the direction of the escaping products of combustion as they traverse the several flues on their way to the exit-pipe H. *h* is an opening, closed by a cap, provided for the purpose of cleaning the annular flue E. The top of the combustion-chamber is arched, as shown at *y y*, for the purpose of deflecting the heat to the outer casing or plates of the stove, thus securing a higher temperature of the radiating surface, and gaining the full benefit of the combustion of the fuel.

By a single continuous current of the entire volume of escaping gases around and underneath the bottom plate, I not only secure a perfect and uniform draft, as aforesaid, with my extended and enlarged horizontal flue, having ample room for the expansion of the gas, but a higher temperature of the extended radiating surface below said plate.

I claim as my invention—

In a coal-supply reservoir heating-stove or furnace, the combination of an extended descending flue in the rear, receiving the entire volume of escaping gaseous products of combustion, an ascending exit-flue, also located in the rear, near to or adjoining the said descending flue, and a horizontal flue below the ash-pan chamber and bottom plate proper of the stove in which the said escaping gaseous products pass in a single continuous current from rear to rear, in a forward course, on one side of the stove from rear to front, and in a backward course on the opposite side from front to rear, impinging in part all around the entire inner circumference of the circular outer plate of said horizontal base-flue, substantially as set forth.

ELIHU SMITH.

Witnesses:
FRANK CHASE SOMES,
D. E. SOMES.